United States Patent
Itskovich et al.

(10) Patent No.: US 7,394,258 B2
(45) Date of Patent: Jul. 1, 2008

(54) HIGH RESOLUTION RESISTIVITY EARTH IMAGER

(75) Inventors: Gregory B. Itskovich, Houston, TX (US); Alexandre N. Bespalov, Spring, TX (US); Randy Gold, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 11/203,829

(22) Filed: Aug. 15, 2005

(65) Prior Publication Data

US 2007/0035305 A1 Feb. 15, 2007

(51) Int. Cl.
*G01V 3/00* (2006.01)
*G01V 3/02* (2006.01)
(52) U.S. Cl. .................................. 324/357; 324/347
(58) Field of Classification Search .......... 324/339–375
See application file for complete search history.

(56) References Cited

U.S. PATENT DOCUMENTS

| | | | |
|---|---|---|---|
| 2,930,969 A | 3/1960 | Baker | 324/347 |
| 3,365,658 A | 1/1968 | Birdwell | 324/373 |
| 3,895,289 A * | 7/1975 | Rickey et al. | 324/323 |
| 4,122,387 A | 10/1978 | Ajam et al. | 324/375 |
| 4,468,623 A | 8/1984 | Gianzero et al. | 324/367 |
| 4,980,642 A * | 12/1990 | Rodney | 324/325 |
| 5,502,686 A | 3/1996 | Dory et al. | 367/34 |
| 5,677,631 A | 10/1997 | Reittinger et al. | 324/324 |
| 6,600,321 B2 | 7/2003 | Evans | 324/369 |
| 6,714,014 B2 | 3/2004 | Evans et al. | 324/374 |
| 6,809,521 B2 * | 10/2004 | Tabarovsky et al. | 324/374 |
| 2002/0153897 A1 | 10/2002 | Evans et al. | 324/374 |
| 2003/0155925 A1 | 8/2003 | Tabarovsky et al. | 324/374 |
| 2004/0051531 A1 | 3/2004 | Chemali et al. | 324/367 |
| 2004/0245991 A1 | 12/2004 | Hayman et al. | 324/374 |
| 2005/0134280 A1 | 6/2005 | Bittar et al. | 324/367 |

FOREIGN PATENT DOCUMENTS

CA 685727 5/1964

* cited by examiner

*Primary Examiner*—Reena Aurora
(74) *Attorney, Agent, or Firm*—Madan, Mossman & Sriram, P.C.

(57) ABSTRACT

Impedance measurements made by a galvanic resistivity tool in a borehole in an earth formation are corrected by a factor that depends on the mud conductivity and the mud dielectric constant. Standoff measurements are not necessary.

22 Claims, 4 Drawing Sheets

HIGH RESOLUTION RESISTIVITY EARTH IMAGER

BACKGROUND OF THE INVENTION

1. Field of the Invention

This invention generally relates to exploration for hydrocarbons involving electrical investigations of a borehole penetrating an earth formation. More specifically, this invention relates to highly localized borehole investigations employing the introduction and measuring of individual survey currents injected into the wall of a borehole by capacitive coupling of electrodes on a tool moved along the borehole with the earth formation.

2. Background of the Art

Electrical earth borehole logging is well known and various devices and various techniques have been described for this purpose. Broadly speaking, there are two categories of devices used in electrical logging devices. In the first category, a measure electrode (current source or sink) are used in conjunction with a diffuse return electrode (such as the tool body). A measure current flows in a circuit that connects a current source to the measure electrode, through the earth formation to the return electrode and back to the current source in the tool. In inductive measuring tools, an antenna within the measuring instrument induces a current flow within the earth formation. The magnitude of the induced current is detected using either the same antenna or a separate receiver antenna. The present invention belongs to the first category.

There are several modes of operation: in one, the current at the measuring electrode is maintained constant and a voltage is measured while in the second mode, the voltage of the electrode is fixed and the current flowing from the electrode is measured. Ideally, it is desirable that if the current is varied to maintain constant the voltage measured at a monitor electrode, the current is inversely proportional to the resistivity of the earth formation being investigated. Conversely, it is desirable that if this current is maintained constant, the voltage measured at a monitor electrode is proportional to the resistivity of the earth formation being investigated. Ohm's law teaches that if both current and voltage vary, the resistivity of the earth formation is proportional to the ratio of the voltage to the current.

Birdwell (U.S. Pat. No. 3,365,658) teaches the use of a focused electrode for determination of the resistivity of subsurface formations. A survey current is emitted from a central survey electrode into adjacent earth formations. This survey current is focused into a relatively narrow beam of current outwardly from the borehole by use of a focusing current emitted from nearby focusing electrodes located adjacent the survey electrode and on either side thereof. Ajam et al (U.S. Pat. No. 4,122,387) discloses an apparatus wherein simultaneous logs may be made at different lateral distances through a formation from a borehole by guard electrode systems located on a sonde which is lowered into the borehole by a logging cable. A single oscillator controls the frequency of two formation currents flowing through the formation at the desired different lateral depths from the borehole. The armor of the logging cable acts as the current return for one of the guard electrode systems, and a cable electrode in a cable electrode assembly immediately above the logging sonde acts as the current return for the second guard electrode system. Two embodiments are also disclosed for measuring reference voltages between electrodes in the cable electrode assembly and the guard electrode systems Techniques for investigating the earth formation with arrays of measuring electrodes have been proposed. See, for example, the U.S. Pat. No. 2,930,969 to Baker, Canadian Patent No. 685727 to Mann et al., U.S. Pat. No. 4,468,623 to Gianzero, and U.S. Pat. No. 5,502,686 to Dory et al. The Baker patent proposed a plurality of electrodes, each of which was formed of buttons which are electrically joined by flexible wires with buttons and wires embedded in the surface of a collapsible tube. The Mann patent proposes an array of small electrode buttons either mounted on a tool or a pad and each of which introduces in sequence a separately measurable survey current for an electrical investigation of the earth formation. The electrode buttons are placed in a horizontal plane with circumferential spacings between electrodes and a device for sequentially exciting and measuring a survey current from the electrodes is described.

The Gianzero patent discloses tool mounted pads, each with a plurality of small measure electrodes from which individually measurable survey currents are injected toward the wall of the borehole. The measure electrodes are arranged in an array in which the measure electrodes are so placed at intervals along at least a circumferential direction (about the borehole axis) as to inject survey currents into the borehole wall segments which overlap with each other to a predetermined extent as the tool is moved along the borehole. The measure electrodes are made small to enable a detailed electrical investigation over a circumferentially contiguous segment of the borehole so as to obtain indications of the stratigraphy of the formation near the borehole wall as well as fractures and their orientations. In one technique, a spatially closed loop array of measure electrodes is provided around a central electrode with the array used to detect the spatial pattern of electrical energy injected by the central electrode. In another embodiment, a linear array of measure electrodes is provided to inject a flow of current into the formation over a circumferentially effectively contiguous segment of the borehole. Discrete portions of the flow of current are separably measurable so as to obtain a plurality of survey signals representative of the current density from the array and from which a detailed electrical picture of a circumferentially continuous segment of the borehole wall can be derived as the tool is moved along the borehole. In another form of an array of measure electrodes, they are arranged in a closed loop, such as a circle, to enable direct measurements of orientations of resistivity of anomalies. U.S. Pat. No. 6,714,014 to Evans et al, having the same assignee as the present invention and the contents of which are incorporated herein by reference, teaches the use of capacitive coupling with both oil-based mud and water-based mud.

The Dory patent discloses the use of an acoustic sensor in combination with pad mounted electrodes, the use of the acoustic sensors making it possible to fill in the gaps in he image obtained by using pad mounted electrodes due to the fact that in large diameter boreholes, the pads will necessarily not provide a complete coverage of the borehole.

The prior art devices, being contact devices, are sensitive to the effects of borehole rugosity: the currents flowing from the electrodes depend upon good contact between the electrode and the borehole wall. If the borehole wall is irregular, the contact and the current from the electrodes is irregular, resulting in inaccurate imaging of the borehole. A second drawback is the relatively shallow depth of investigation caused by the use of measure electrodes at the same potential as the pad and the resulting divergence of the measure currents. Another drawback is that in formations with low resistivity (such as the Gulf of Mexico), the measured signal is dominated by effects of the borehole fluid. It would be desirable to have an apparatus and method of determination of formation resistivity that is relatively insensitive to borehole rugosity and can be used with either water based or with oil-based muds. The present invention satisfies this need.

SUMMARY OF THE INVENTION

One embodiment of the present invention is a method of determining a resistivity parameter of an earth formation. Current is conveyed into the earth formation from a current electrode. Based on the current and/or a potential of the electrode, an apparent impedance is determined. From the apparent impedance, a resistivity is determined using a correction factor based on the conductivity and the dielectric constant of the borehole mud. The mud may be non-conductive and the current may be capacitively coupled to the earth formation.

Another embodiment of the present invention is an apparatus for determining a resistivity parameter of an earth formation. A current electrode conveys a measure current into the earth formation. A processor determines an apparent impedance from the current and/or potential of the electrode. The processor determines the formation resistivity from the apparent impedance by using a correction factor related to the dielectric constant and conductivity of the borehole fluid. The apparatus may include devices for measuring the conductivity and/or the dielectric constant of the borehole fluid. A plurality of current electrodes may be disposed on a pad extendable from a body of a logging tool. The logging tool may have a plurality of pads. The processor may produce an image of the borehole wall.

Another embodiment of the present invention is a computer readable medium for use with an apparatus for determining a resistivity parameter of an earth formation. The apparatus includes a current electrode which conveys a measure current into the earth formation. The medium includes instructions which enable a processor to determine an apparent impedance from the current and/or potential of the electrode. The medium further includes instructions which enable the processor to determine the formation resistivity from the apparent impedance by using a correction factor related to the dielectric constant and conductivity of the borehole fluid.

BRIEF DESCRIPTION OF THE FIGURES

The present invention is best understood with reference to the accompanying figures in which like numerals refer to like elements and in which.

DETAILED DESCRIPTION OF THE INVENTION

Figure 1:
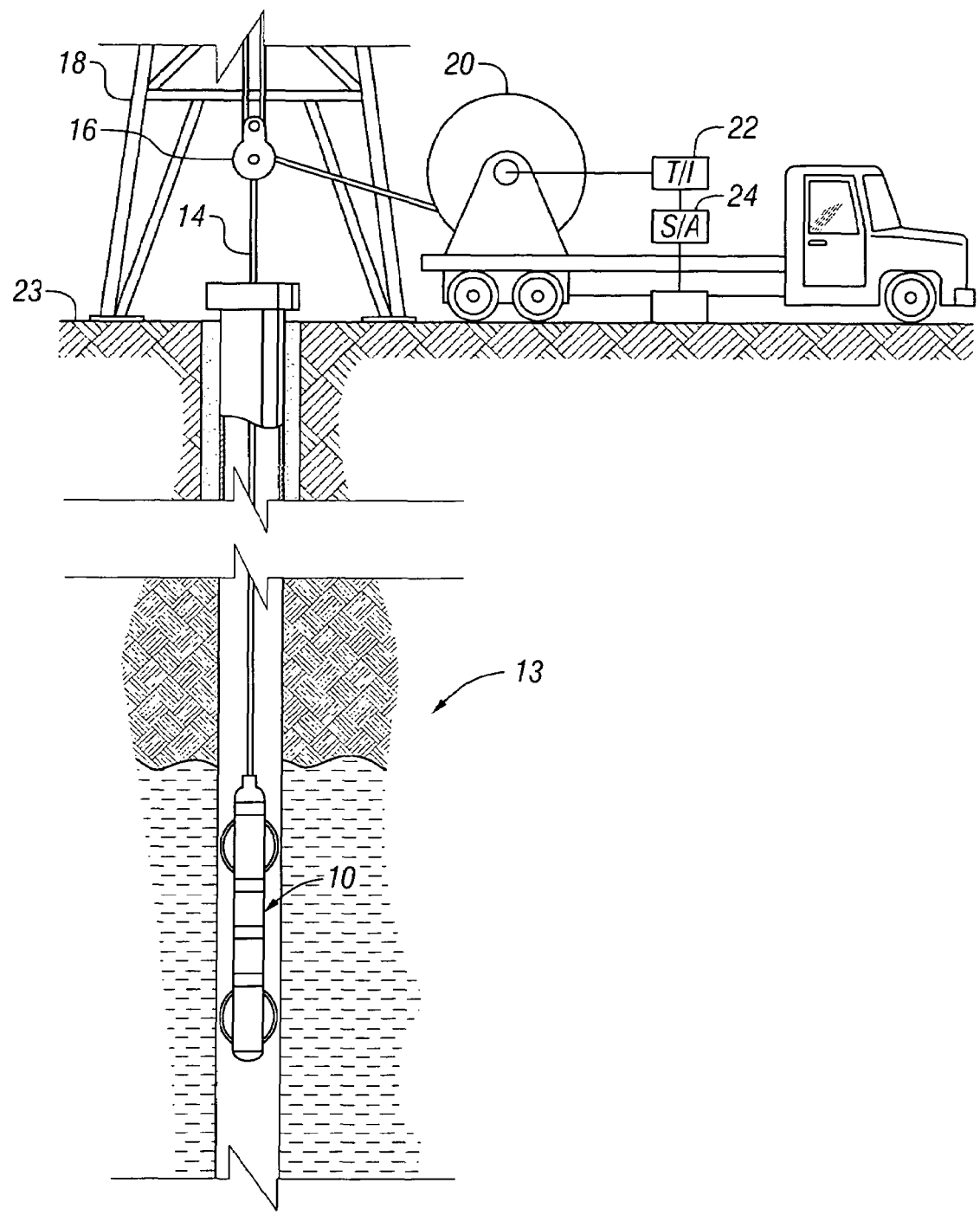
FIG. 1 (prior art) shows an exemplary logging tool suspended in a borehole.

FIG. 1 shows an exemplary imaging tool 10 suspended in a borehole 12, that penetrates earth formations such as 13, from a suitable cable 14 that passes over a sheave 16 mounted on drilling rig 18. By industry standard, the cable 14 includes a stress member and seven conductors for transmitting commands to the tool and for receiving data back from the tool as well as power for the tool. The tool 10 is raised and lowered by draw works 20. Electronic module 22, on the surface 23, transmits the required operating commands downhole and in return, receives data back which may be recorded on an archival storage medium of any desired type for concurrent or later processing. The data may be transmitted in analog or digital form. Data processors such as a suitable computer 24, may be provided for performing data analysis in the field in real time or the recorded data may be sent to a processing center or both for post processing of the data.

Figure 2A:
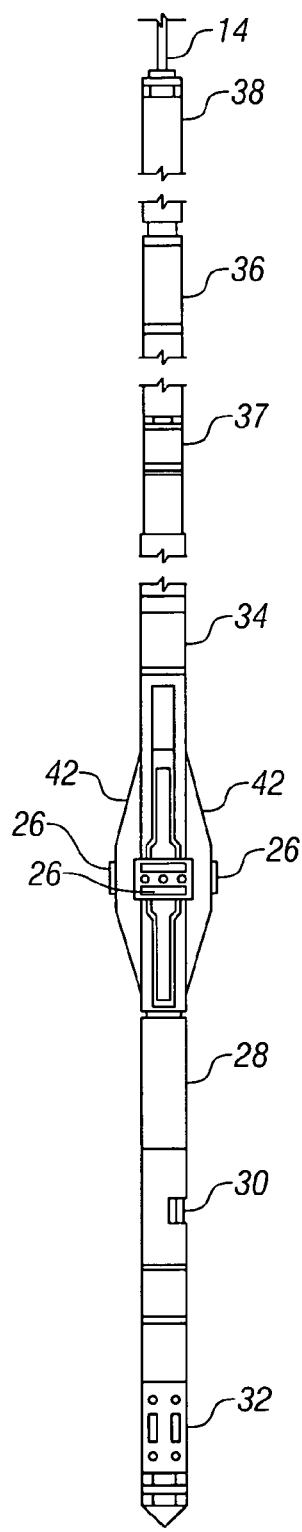
FIG. 2A (prior art) is a mechanical schematic view of an exemplary imaging tool.

FIG. 2a is a schematic external view of a borehole sidewall imager system. The tool 10 comprising the imager system includes resistivity arrays 26 and, optionally, a mud cell 30 and a circumferential acoustic televiewer 32. Electronics modules 28 and 38 may be located at suitable locations in the system and not necessarily in the locations indicated. The components may be mounted on a mandrel 34 in a conventional well-known manner. The outer diameter of the assembly is about 5 inches and about fifteen feet long. An orientation module 36 including a magnetometer and an accelerometer or inertial guidance system may be mounted above the imaging assemblies 26 and 32. The upper portion 38 of the tool 10 contains a telemetry module for sampling, digitizing and transmission of the data samples from the various components uphole to surface electronics 22 in a conventional manner. If acoustic data are acquired, they are preferably digitized, although in an alternate arrangement, the data may be retained in analog form for transmission to the surface where it is later digitized by surface electronics 22.

Figure 2B:
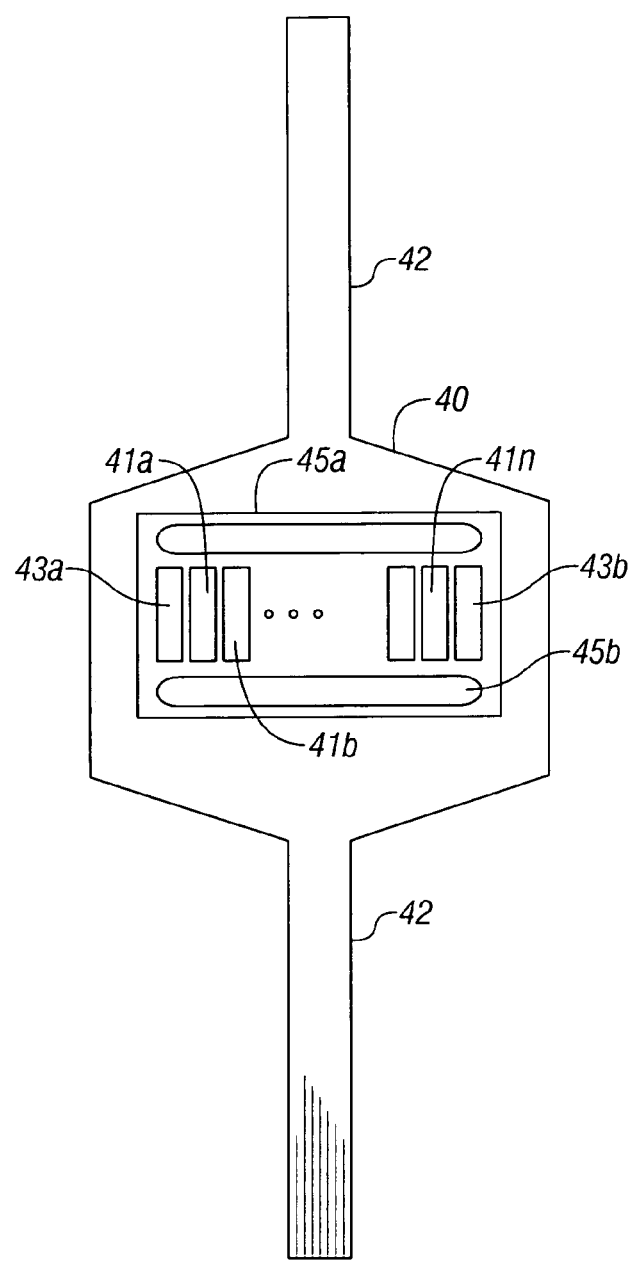
FIG. 2B (prior art) is a detail view of an electrode pad of an exemplary logging tool.

Also shown in FIG. 2A are three resistivity arrays 26 (a fourth array is hidden in this view. Referring to FIGS. 2A and 2B, each array includes measure electrodes 41a, 41b, . . . 41n for injecting electrical currents into the formation, focusing electrodes 43a, 43b for horizontal focusing of the electrical currents from the measure electrodes and focusing electrodes 45a, 45b for vertical focusing of the electrical currents from the measure electrodes. By convention, "vertical" refers to the direction along the axis of the borehole and "horizontal" refers to a plane perpendicular to the vertical.

Figure 3:
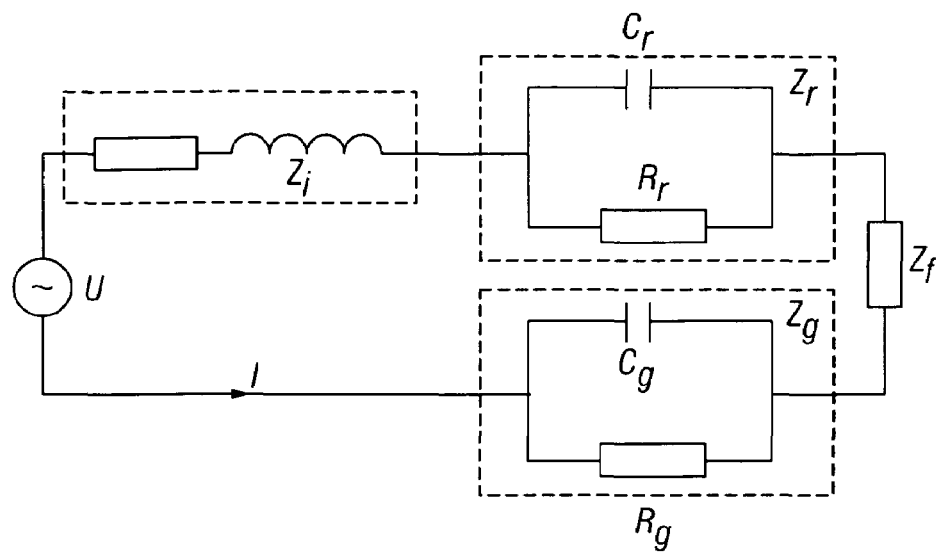
FIG. 3 is an equivalent circuit representation of a resistivity tool in a borehole.

The approximate schematic circuit diagram is presented in FIG. 3. It shows that the current in the circuit depends on the internal impedance of the tool $Z_i$, the impedance due to the standoff between return electrode and formation $Z_R$, the impedance due to the gap between receiver and formation $Z_g$ and the formation impedance $Z_f$. For most practical purposes, the internal impedance of the tool $Z_i$ may be ignored. Similarly, the impedance at the return electrode $Z_R$ is also small and may be ignored in one embodiment of the invention. It should be noted that the method may be used, with minor modifications, even if $Z_R$ is not ignored. Another simplifying assumption is that the formation impedance is resistive, denoted by $R_f$. Under these conditions, if U is the applied voltage then the current in the circuitry is $$I = \frac{U}{Z_g + R_f}. \tag{1}$$

In case of a conductive formation ($\rho$<10 $\Omega$-m) and oil-based mud the contribution of the formation into the effective impedance is small $R_f$<<$Z_G$ and we can expect a reduction of the sensitivity of the measured impedance to the resistivity of the formation. The gap impedance $Z_G$, which depends on the mud properties and the receiver standoff, becomes a major contributor into the effective impedance. At a frequency f (corresponding to an angular frequency ω=2πf, we get $$Z_e = R_f + \frac{1}{r^{-1} + i\omega C} = A + iB \qquad (2)$$

where A and B correspond to the real and imaginary parts of the impedances $Z_e$. From eqn. (2) we also have:

$$Z_e = A + iB = R_f + \frac{r}{1 + (r\omega C)^2} - i\frac{r^2\omega C}{1 + (r\omega C)^2} \qquad (3)$$

By introducing parameter $$\alpha = \frac{1}{r\omega C} = \frac{\sigma_m}{\omega \varepsilon_m \varepsilon_0},$$

which depends only on conductivity $\sigma_m$ and dielectric constant of the mud $\in_m$, we can further derive from the equations (3):

$$Z_e = A + iB = R_f + \frac{r\alpha}{1 + \alpha} - i\frac{r}{1 + \alpha}, . \qquad (4)$$

From eqn. (4) for the formation resistivity $R_f$ we have:

$$R_f = A - \alpha|B|. \qquad (5).$$

Eqn. (5) allows us to filter out the contribution of the mud into the real part of the impedance measurements and increase a sensitivity of the measurements to the parameter of interest $R_f$. We call this procedure alpha-correction.

Figure 4:
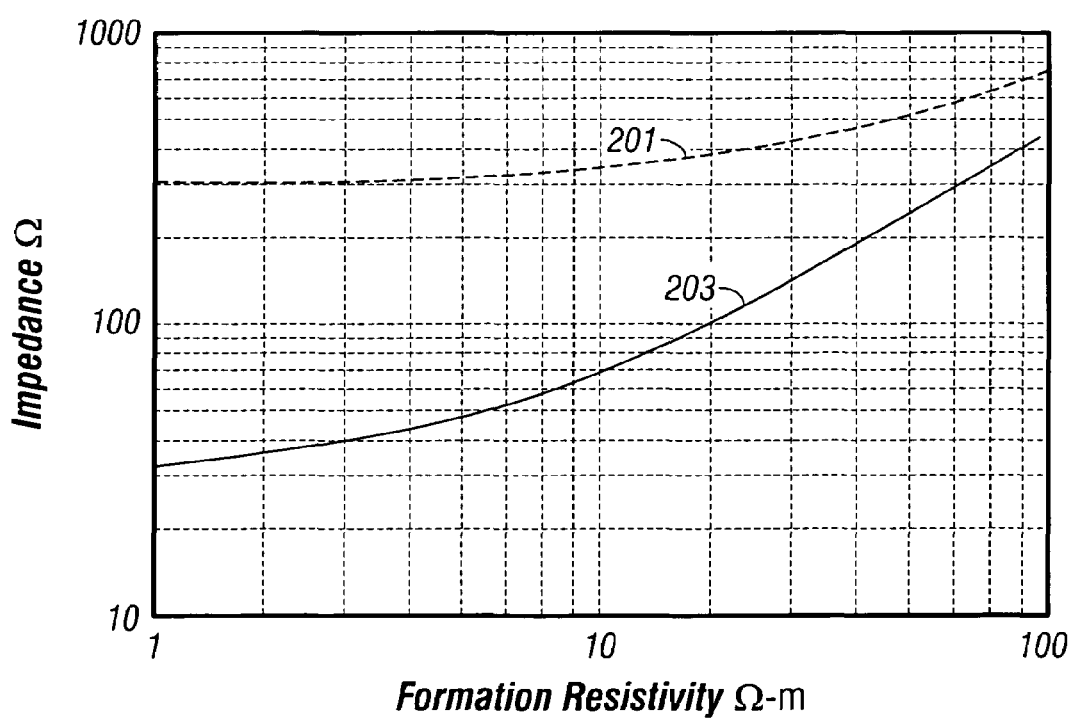
FIG. 4 is compares the sensitivity of exemplary impedance measurements to the formation resistance with the sensitivity using the method of the present invention.

To illustrate the effectiveness of the alpha-correction we present mathematical modeling for the different formation models. The first example corresponds to the case of the tool placed in the 8.5 inch (21.59 cm) well filled with $10^4$ Ω-m resistive mud and dielectric constant $\in_m$=3. The formation is presented by a cylindrical layer with resistivity varying from 1 Ω-m to 100 Ω-m. The return of the tool represents a conductive cylinder of 10 m in length. Current is injected into the formation through 1.6 cm long cylindrical electrode that has 1 mm standoff with respect to the formation. The transmitter provides an output voltage of 1V at frequency of 1 MHz. In FIG. 4 we present the real part of the impedance for two cases. The operating frequency is 1 MHz. The curve 201 represents the real part of the impedance while the curve 203 is the alpha-corrected impedance. As can be seen from the FIG. 4, the alpha-corrected impedance has superior sensitivity to the formation resistivity compared with the single frequency impedances. The advantage of the corrected impedance is also observed in the case of stratified formation model.

Figure 5:
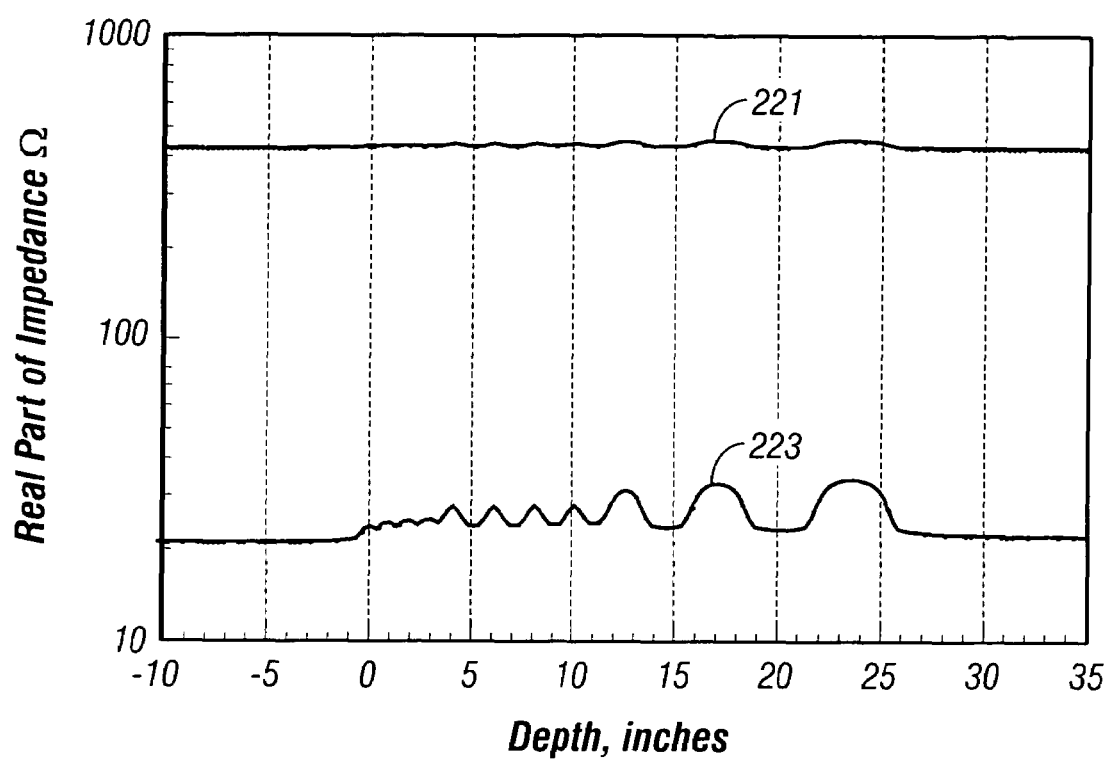
FIG. 5 is an example which illustrates the use of the present impedance with a layered earth model.

In FIG. 5 we present mathematical modeling results in case of formation which includes sequence of resistive (10 Ω-m) and conductive (1 Ω-m) layers. The thickness of the layers varies from the left to the right between 0.5 in (1.27 cm) to 4 inches (10.16 cm). The curve 221 is the uncorrected response while the curve 223 is response with the alpha-correction applied. 221 is less sensitive than the corrected curve 223 and also lacks the resolution of the latter.

The method of the present invention does not require measurement of the standoff. What is needed are measurements of mud resistivity and dielectric constant. Determination of mud resistivity may be made downhole using the method and apparatus described in U.S. Pat. No. 6,803,039 to Fabris et al., having the same assignee as the present invention and the contents of which are incorporated herein by reference. The dielectric constant may be determined using the method and apparatus described in U.S. Pat. No. 5,677,631 to Reittinger et al., having the same assignee as the present invention and the contents of which are incorporated herein by reference.

The processing of the measurements may be done by a downhole processor, a surface processor, or by a processor at a remote location. The term "processor" as used in this document is intended to include devices such as field programmable gate arrays (FPGAs).

The resistivity measurements made by the individual sensors on one or more pads may be combined to produce a resistivity image of the borehole wall This is discussed in Evans.

The invention has further been described by reference to logging tools that are intended to be conveyed on a wireline. However, the method of the present invention may also be used with measurement-while-drilling (MWD) tools, or logging while drilling (LWD) tools, either of which may be conveyed on a drillstring or on coiled tubing. An example of a resistivity imaging tool for MWD use is discloses in U.S. Pat. No. 6,600,321 to Evans, having the same assignee as the present invention and the contents of which are incorporated herein by reference.

Implicit in the processing of the data is the use of a computer program implemented on a suitable machine readable medium that enables the processor to perform the control and processing. The term processor as used in this application is intended to include such devices as field programmable gate arrays (FPGAs). The machine readable medium may include ROMs, EPROMs, EAROMs, Flash Memories and Optical disks. As noted above, the processing may be done downhole or at the surface.

While the foregoing disclosure is directed to the preferred embodiments of the invention, various modifications will be apparent to those skilled in the art. It is intended that all variations within the scope and spirit of the appended claims be embraced by the foregoing disclosure.

What is claimed is:

1. An apparatus for sensing a resistivity parameter of an earth formation penetrated by a borehole, the apparatus comprising:
   (a) at least one measure electrode configured to convey a measure current into the formation, the at least one measure electrode having a potential; and
   (b) a processor configured to estimate the resistivity parameter based at least in part on:
      (A) an impedance determined from at least one of (I) the measure current, and (II) the potential, and
      (B) a correction factor for the resistivity parameter related to a conductivity of a fluid in the borehole and a dielectric constant of the fluid in the borehole.

2. The apparatus of claim 1 wherein the at least one measure electrode comprises a plurality of measure electrodes.

3. The apparatus of claim 2 further comprising an additional pad having a plurality of measure electrodes, the additional pad extendable from the body of the logging tool.

4. The apparatus of claim 2 wherein the plurality of measure electrodes are disposed on a pad extendable from a body of a logging tool conveyed in the borehole.

5. The apparatus of claim 1 wherein the borehole contains a substantially non-conducting fluid therein.

6. The apparatus of claim 1 further comprising at least one device configured to measure at least one of the dielectric constant of the fluid and the conductivity of the fluid.

7. The apparatus of claim 1 wherein the resistivity parameter comprises a resistivity image of the wall of the borehole.

8. The apparatus of claim 1 wherein the processor is configured to determine the resistivity parameter by using a relation of the form:

$$R_f = A - \alpha |B|$$

where A is a real part of the impedance, B is the imaginary part of the impedance, and α is given by the relation:

$$\alpha = \frac{\sigma_m}{\omega \varepsilon_m \varepsilon_0}$$

where $\sigma_m$ is the conductivity of the borehole fluid, ω is an angular frequency of the measure current, $\in_m$ is a relative dielectric constant of the borehole fluid, and $\in_0$ is the permittivity of free space.

9. The apparatus of claim 1 further comprising a conveyance device which conveys the at least one measure electrode into the borehole.

10. The apparatus of claim 1 wherein the correction factor is related to a ratio of the conductivity of the fluid to the dielectric constant of the fluid.

11. The apparatus of claim 1 wherein the processor is configured to determine the resistivity parameter from the real part of the impedance, the imaginary part of the impedance, the conductivity of the borehole fluid and the dielectric constant of the borehole fluid.

12. A method of estimating a resistivity parameter of an earth formation penetrated by a borehole, the method comprising:
    (a) conveying a measure current into the formation using at least one measure electrode;
    (b) determining an impedance from at least one of the measure current and a potential of the at least one measure electrode;
    (c) estimating the resistivity parameter from the determined impedance, using a correction factor for the resistivity parameter comprising a function of a conductivity of a fluid in the borehole and a dielectric constant of the fluid in the borehole; and
    (d) recording the estimated resistivity parameter to a suitable medium.

13. The method of claim 12 further comprising using at least one additional measure electrode.

14. The method of claim 13 further comprising positioning the at least one measure electrode and the at least one additional measure electrode on a pad extendable from the body of a logging tool.

15. The method of claim 14 wherein the resistivity parameter comprises a resistivity image of the wall of the borehole.

16. The method of claim 14 wherein determining the resistivity parameter further comprises using a relation of the form:

$$R_f = A - \alpha |B|$$

where A is a real part of the impedance, B is the imaginary part of the impedance, and α is given by the relation:

$$\alpha = \frac{\sigma_m}{\omega \varepsilon_m \varepsilon_0}$$

where $\sigma_m$ is the conductivity of the borehole fluid, ω is an angular frequency of the measure current, $\in_m$ is a relative dielectric constant of the borehole fluid, and $\in_0$ is the permittivity of free space.

17. The method of claim 12 further comprising using a substantially non-conductive fluid in the borehole.

18. The method of claim 12 further comprising measuring at least one of (i) the dielectric constant of the borehole fluid and (ii) the conductivity of the borehole fluid.

19. The method of claim 12 further comprising determining the resistivity parameter from the real part of the impedance, the imaginary part of the impedance, the conductivity of the borehole fluid and the dielectric constant of the borehole fluid.

20. A computer readable medium for use with an apparatus which senses a resistivity parameter of an earth formation penetrated by a borehole, the apparatus comprising:
    (a) at least one measure electrode configured to convey a measure current into the formation;
    the medium comprising instructions which enable a processor:
    (b) to estimate the resistivity parameter based at least in part on:
        (A) a determined impedance, and
        (B) a correction factor for the resistivity parameter that comprises a function of a conductivity of a fluid in the borehole and a dielectric constant of the fluid in the borehole; and
    (c) to record the estimated resistivity parameter to a suitable medium.

21. The computer readable medium of claim 20 further comprising at least one of (i) a ROM, (ii) an EPROM, (iii) an EAROM, (iv) a Flash Memory, and (v) an Optical disk.

22. A method of estimating a resistivity parameter of an earth formation penetrated by a borehole, the method comprising:
    (a) conveying a measure current into the formation using at least one measure electrode;
    (b) determining an impedance from at least one of the measure current and a potential of the at least one measure electrode; and
    (c) estimating the resistivity parameter from the determined impedance, using a ratio of a conductivity of a fluid in the borehole and a dielectric constant of the fluid in the borehole.

* * * * *